United States Patent
Wolf et al.

(10) Patent No.: US 7,484,134 B2
(45) Date of Patent: Jan. 27, 2009

(54) METHOD AND SYSTEM FOR INTERNET-BASED SOFTWARE SUPPORT

(75) Inventors: Werner Wolf, Wiesloch (DE); Stefan Krimmel, Muehlhausen (DE); Dirk Eyermann, Ettlingen (DE)

(73) Assignee: SAP AG, Walldorf (DE)

( * ) Notice: Subject to any disclaimer, the term of this patent is extended or adjusted under 35 U.S.C. 154(b) by 553 days.

(21) Appl. No.: 11/099,493

(22) Filed: Apr. 6, 2005

(65) Prior Publication Data
US 2006/0112106 A1 May 25, 2006

Related U.S. Application Data

(60) Provisional application No. 60/629,900, filed on Nov. 23, 2004.

(51) Int. Cl.
*G06F 11/00* (2006.01)

(52) U.S. Cl. ............................ 714/57; 714/46; 714/48

(58) Field of Classification Search ............ 707/10; 714/38, 48, 57, 26, 45, 46; 717/168, 171, 717/172
See application file for complete search history.

(56) References Cited

U.S. PATENT DOCUMENTS

| | | | |
|---|---|---|---|
| 6,615,376 B1 * | 9/2003 | Olin et al. ............. | 714/57 |
| 7,032,016 B2 * | 4/2006 | Cerami et al. ............ | 709/223 |
| 7,380,171 B2 * | 5/2008 | Prescott et al. ............. | 714/38 |
| 7,389,341 B2 * | 6/2008 | Cornelius et al. .......... | 709/224 |
| 2002/0087680 A1 * | 7/2002 | Cerami et al. ............. | 709/224 |
| 2003/0110412 A1 * | 6/2003 | Neville ................ | 714/25 |
| 2003/0149919 A1 * | 8/2003 | Greenwald et al. ......... | 714/43 |
| 2004/0010496 A1 * | 1/2004 | Behrendt et al. ........... | 707/10 |
| 2004/0078683 A1 * | 4/2004 | Buia et al. ............. | 714/37 |
| 2004/0186903 A1 * | 9/2004 | Lambertz ................ | 709/224 |
| 2005/0081079 A1 * | 4/2005 | Cheston et al. ............ | 714/2 |
| 2005/0081108 A1 * | 4/2005 | Shabalin ................ | 714/38 |
| 2005/0081118 A1 * | 4/2005 | Cheston et al. ............ | 714/47 |
| 2005/0154940 A1 * | 7/2005 | Umeda ................. | 714/25 |
| 2005/0204199 A1 * | 9/2005 | Harper et al. ............. | 714/38 |
| 2006/0069957 A1 * | 3/2006 | Ganesh et al. ............. | 714/26 |

OTHER PUBLICATIONS

Web-Based Issue Tracking for Large Software Projects by John R. Callahan and Reshma R. Khatsuriya, IEEE Internet Computing, 1089-7801/9 8, Sep. •Oct. 1998.*
ActiveLog version 3.3.1, Websina,Jan. 8, 2004.*
The Bugzilla Guide by Matthew P. Barnson, Aug. 7, 2001.*
Bugzillia Release Information by The mozillia organization Sep. 17, 2007.*

* cited by examiner

*Primary Examiner*—Joshua A Lohn
(74) *Attorney, Agent, or Firm*—Kenyon & Kenyon LLP (57) ABSTRACT

Embodiments of the present invention relate to an automated method and system for locally creating a support message and sending the support message to a support provider via the Internet, wherein information relating to at least one of a system identifier and an installation identifier corresponding to a local system on which the support message is created is automatically collected and sent with the support message.

21 Claims, 7 Drawing Sheets

METHOD AND SYSTEM FOR INTERNET-BASED SOFTWARE SUPPORT

This application claims the benefit under 35 USC 119(e) of U.S. provisional application 60/629,900 filed Nov. 23, 2004 and fully incorporated herein by reference.

BACKGROUND OF THE INVENTION

A help desk service or support desk service is a service for assisting software users to fix problems in their software. Most software vendors offer their customers a support desk service.

Many variations of support desk services exist, but most involve some mechanism for allowing a software user to report a software problem to a support provider, typically the software developer or persons otherwise knowledgeable about the software. In one known implementation of a support desk service, customers are provided with a direct link to a support provider. More specifically, a customer may be provided with a communication path, such as a dedicated phone connection, that gives the customer 24-hour-a-day access to the support provider.

One example of the latter is a support desk service provided to customers of the SAP (more completely, SAP Aktiengesellschaft) R/3® system. The R/3® system originated in a mainframe computer environment and accordingly its users were typically high-end customers such as large corporations that could afford the associated costs. Because of their importance, these high-end customers expected and received direct access to support providers, in the form of direct, full-time communications links.

SAP has expanded into other markets and now offers, for example, a "Business One" software package targeted to small-to-midsize businesses. These kinds of customers typically cannot afford the cost of a direct link to a support provider. Accordingly, it would be beneficial to provide a low-cost support desk service to such customers.

DETAILED DESCRIPTION

Embodiments of the present invention relate to a support desk service which does not require a direct link to a support provider. Instead, a support message may be created on a computer system without a direct link to a support provider. A connection with the Internet may be established, and the support message may be sent via the Internet to a server computer. Information relating to at least one of a system identifier and an installation identifier corresponding to a local system on which the support message is created may be automatically collected and sent with the support message, to enable the support message to be routed to the appropriate support provider. Because the support service does not require a full-time direct link to a support provider, the service may be offered to customers for a comparatively low cost.

A support provider intermediate to the local support seeker and an end support provider may handle the support message initially. The intermediate support provider may have a skill level that is able to address certain kinds of problems, but not all problems. Some problems may require attention at a higher skill or knowledge level. If the intermediate support provider cannot resolve the problem identified in the support message, the intermediate support provider may pass the support message on to the end support provider, which could be, for example, the software developer.

When the support seeker creates the support message locally, the support seeker may invoke support software resident on a local computer system. The software may present the support seeker with one or more screen displays comprising a plurality of fields, some displaying information and some calling for input. The input fields may include a field for a title, a field for identifying a priority, a field for a description of the problem for which support is sought, and a component field to identify a software component where the problem occurred. The input fields may further allow for identification of a language (e.g., English, German, French) in which the support message is to be reported.

According to embodiments of the present invention, following the invocation of the support software, functionality may execute in the background to automatically collect identifying and routing information for the support message. The identifying and routing information automatically collected may include a system identifier, an installation identifier, and a country version of the system database. It may be appreciated that, by contrast, a prior art support desk service with a direct link would not automatically gather such identifying and routing information, since it would be implicit in the direct link. Moreover, automatically collecting the identifying and routing information offloads this task from the user, who would otherwise have to manually perform this potentially time-consuming and error-prone work.

The support software may further enable the support seeker to connect to the Internet to send the support message after its creation. When sent, the support message may go to a server computer connected to the Internet. The server computer may include functionality for storing and processing messages in electronic format. In particular, the server computer may include functionality for storing and processing "electronic mail" or "e-mail." Accordingly, the server may provide a storage system popularly known as "inboxes" for its e-mail clients. The e-mail clients served by the server may include one or more intermediate support providers, and an end support provider, each with respective inboxes. When the support message arrives at the server, it may be automatically determined, based on the identifying and routing information contained in the message, in which support provider's inbox the message should be placed. A given intermediate support provider may have access through the Internet to its inbox(es), in order to be able to monitor its inbox(es) for support messages from those support seekers for which it is responsible.

Figure 1:
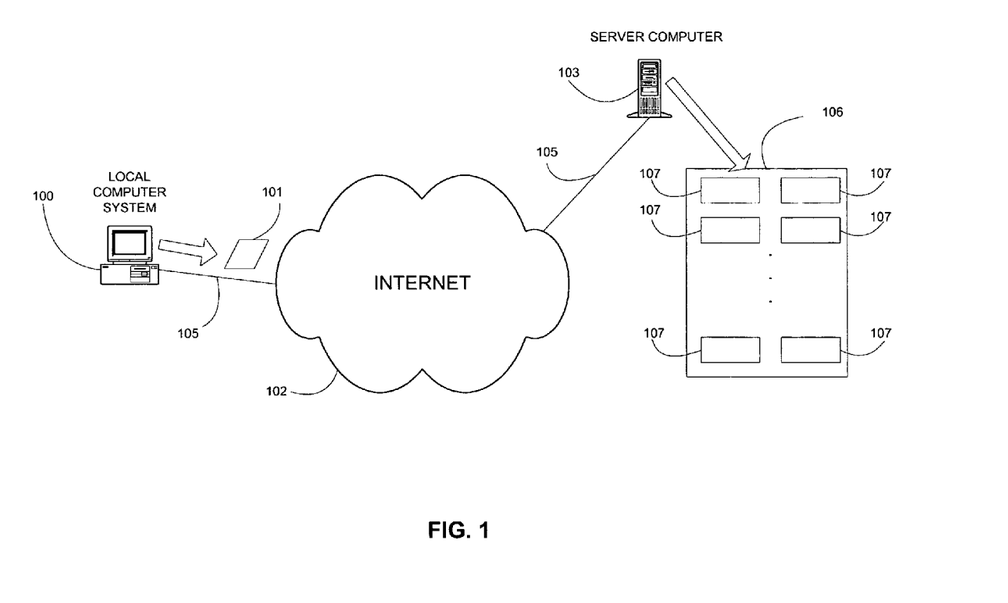
FIG. 1 shows a network according to embodiments of the present invention.

FIG. 1 shows an arrangement according to embodiments of the present invention. The arrangement may comprise a local computer system 100 configured with software according to embodiments of the present invention. Using the software, a support seeker may create a support message 101. Information including a system identifier and installation identifier corresponding to the local computer system 100 may be automatically collected by the software and included in the support message 101. The support seeker further may use the software to establish a connection with the Internet 102 via a communications link 105 (where the communication link 105 represents wired and/or wireless physical media coupling a node to the Internet 102). The support message 101 may be sent through the Internet to a server computer 103 comprising e-mail functionality as described above. The server computer 103 may include a storage area 106 for storing e-mail in a plurality of inboxes 107. When the support message 101 arrives at the server 103 and is stored, it may be routed to an appropriate inbox 107 based on at least one of the system identifier and installation identifier included in the message. The server 103 may be accessible, for example via the Internet, to one or more intermediate support providers, responsible for handling support messages received on the server 103 and stored in inboxes respectively corresponding to the one or more intermediate support providers.

An intermediate support provider may attempt to resolve the problem described in the support message, and if able to, provide the support seeker with a solution to his problem. The solution could involve, for example, sending the support seeker a software "patch" to correct the support seeker's software, or could involve simply advising the support seeker in some way. If the intermediate support provider is unable to resolve the problem, the support message may be passed on to an end support provider, such as the developer of the software having the problem described in the message. The support message could be, for example, transferred to an inbox 107 corresponding to the end support provider. The support seeker (which could also be the intermediate support provider) is then informed automatically that a solution is provided and will be asked to download the solution on the server via the Internet back to the support seeker The foregoing process is shown graphically in FIG. 2. A support seeker may create a support message and (1) connect to the Internet to send the support message to an intermediate support provider. When the intermediate support provider opens the support message and begins work on the problem described, the message may (2) be assigned an "in-progress" status. The intermediate support provider may identify needs for additional information, in which case the intermediate support provider may (3) generate a reply to the support seeker soliciting additional information. The support seeker may (4) respond with the additional information. The reply/answer protocol may be repeated as many times as necessary for the intermediate support provider to either resolve the problem or to determine that it is unable to resolve the problem. The reply/answer protocol may be implemented by exchanging the associated information via the Internet.

Figure 2:
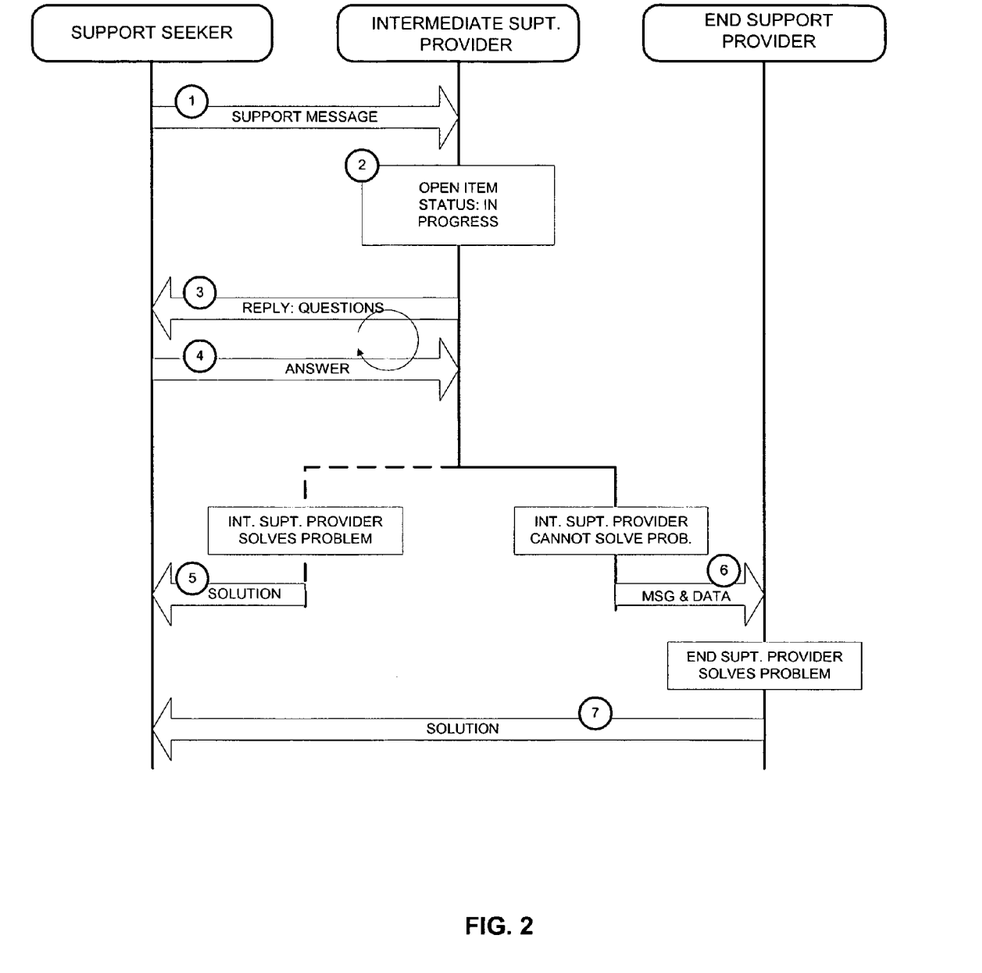
FIG. 2 shows a process flow according to embodiments of the present invention.

If the intermediate support provider resolves the problem, the intermediate support provider may (5) communicate the solution to the support seeker. The solution could involve, for example, additional training, a configuration change that permits the support seeker to operate his system properly, or applying a software patch.

On the other hand, if the intermediate support provider cannot resolve the problem, the intermediate support provider may (6) transfer the support message and any pertinent data to the end support provider. The end support provider may design a solution to the problem and (7) communicate the solution (e.g., a software patch) to the support seeker.

Over the course of the above-described events, a support seeker may be able to check on the progress of work on his support message by, for example, linking to an Internet site where the status of work on his support message is recorded and updated as changes to its status occur. The Internet site could be, for example, a central support site provided by the software developer.

Figure 3A:
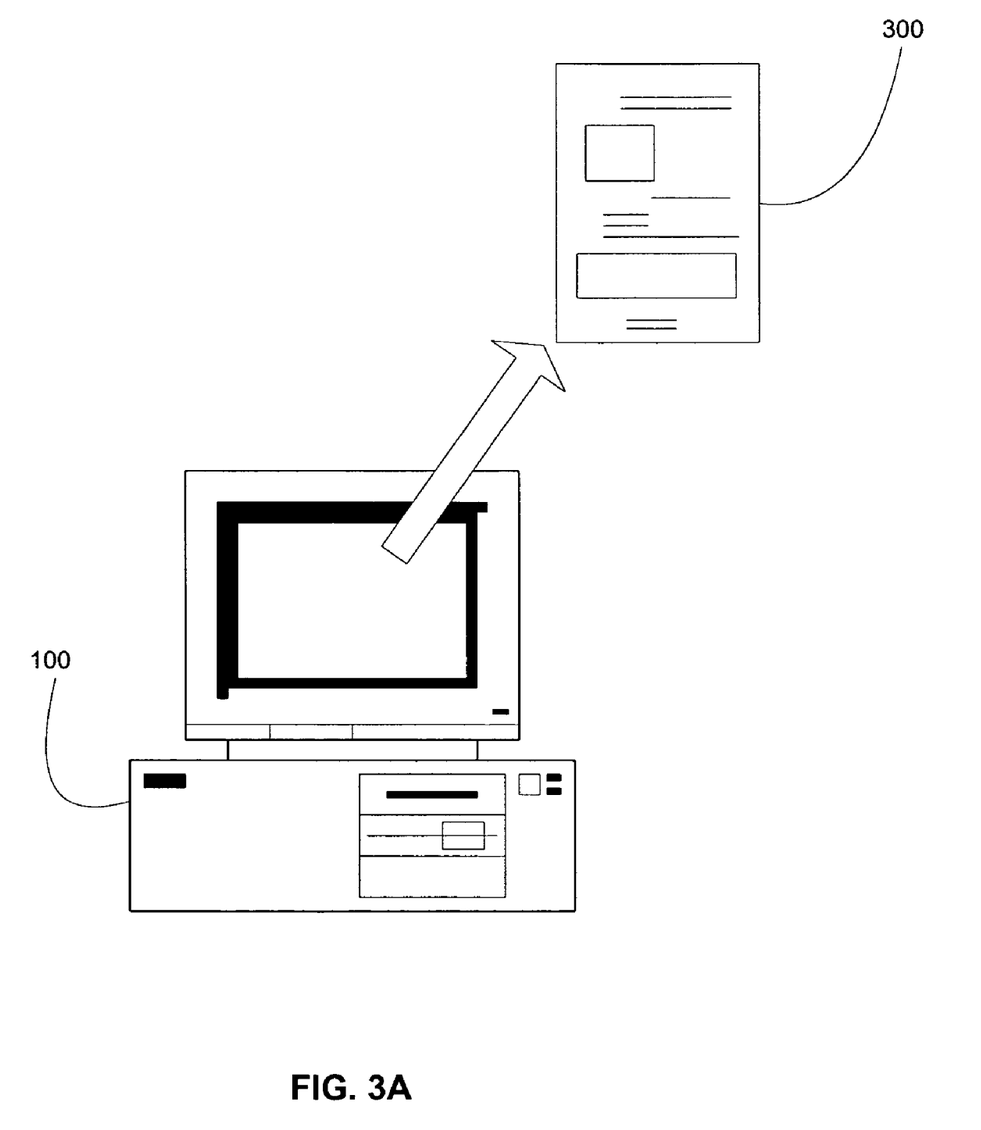
FIGS. 3A, 3B and 3C show a local computer system and a screen display according to embodiments of the present invention.

As noted above, when a support seeker creates the support message locally, the support seeker may invoke support software resident on a local computer system. This is illustrated in FIG. 3A. A local computer system 100 could include, for example, a desktop personal computer with an electronic display device such as a monitor, and an input device such as a keyboard and/or mouse. A support seeker might, for example, use a mouse to click on a "Support" button in a screen display of a user interface of the local computer system. In response, software according to embodiments of the present invention may execute to link the local computer system 100 to the server 103 and to present the support seeker with a screen display 300 on the display device, where the display 300 comprises a plurality of fields, some displaying information and some calling for input. To link the local computer system 100 to the server 103, the software may execute an Internet browser.

Figure 3B:
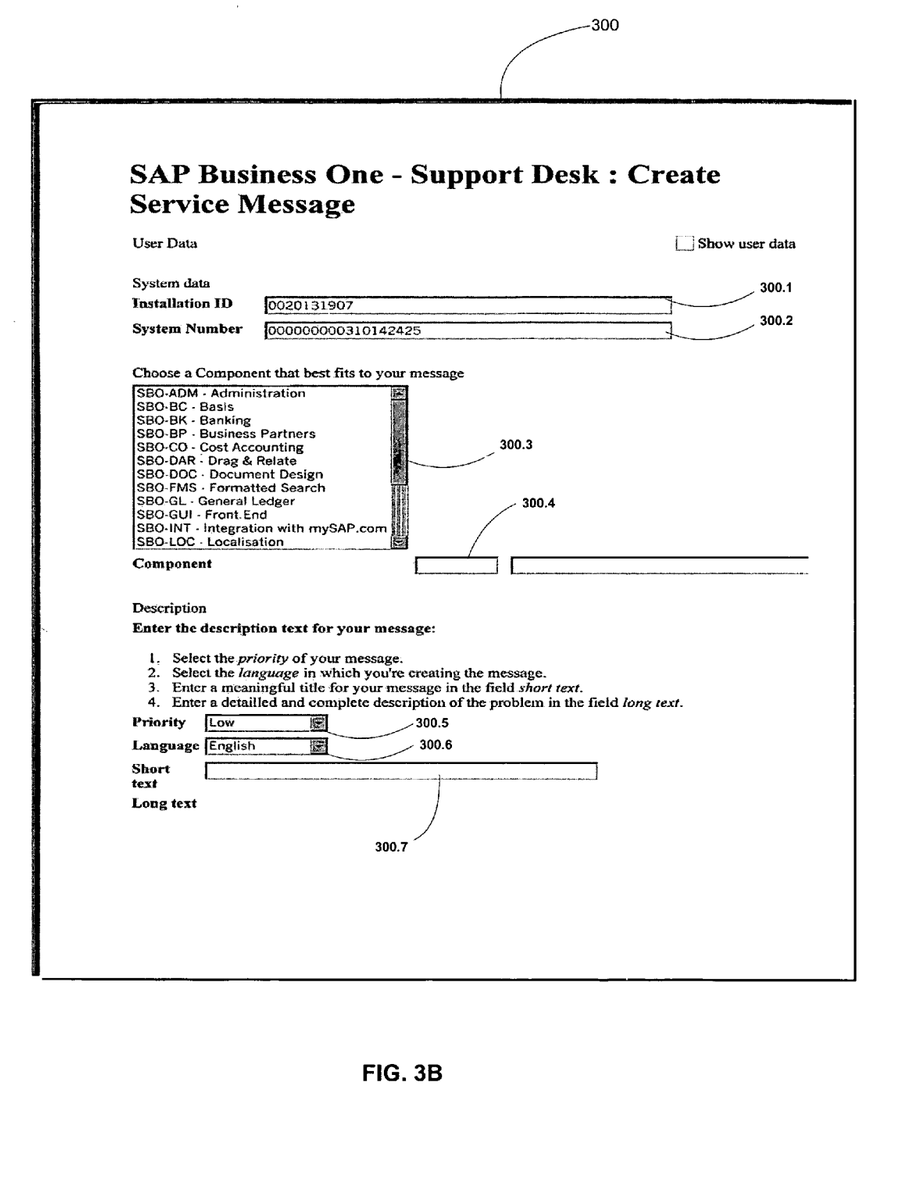

FIG. 3B shows a more detailed example of the screen display 300. (It is noted that, for ease of presentation, the screen display 300 is presented in two parts in FIGS. 3B and 3C. However, in embodiments, the screen display 300 may be a single, scrollable display). The screen display 300 may correspond to an HTML (Hyper-Text Markup Language) document generated by an application on the server 103 in response to the connection made by the local computer system 100. The fields of the screen display may include an installation identifier field 300.1 and a system identifier field 300.2 corresponding to the local system 100. As noted earlier, this information may be collected automatically. The fields may further include a selection list of components 300.3 in which the problem being reported is or is believed to be, and a field 300.4 for designating a selected component. The fields may further include a field 300.5 for designating a priority of the support message, a field 300.6 for designating a language of the message (e.g., English, German, French), and a field 300.7 for a title or short description of the problem being reported.

Figure 3C:
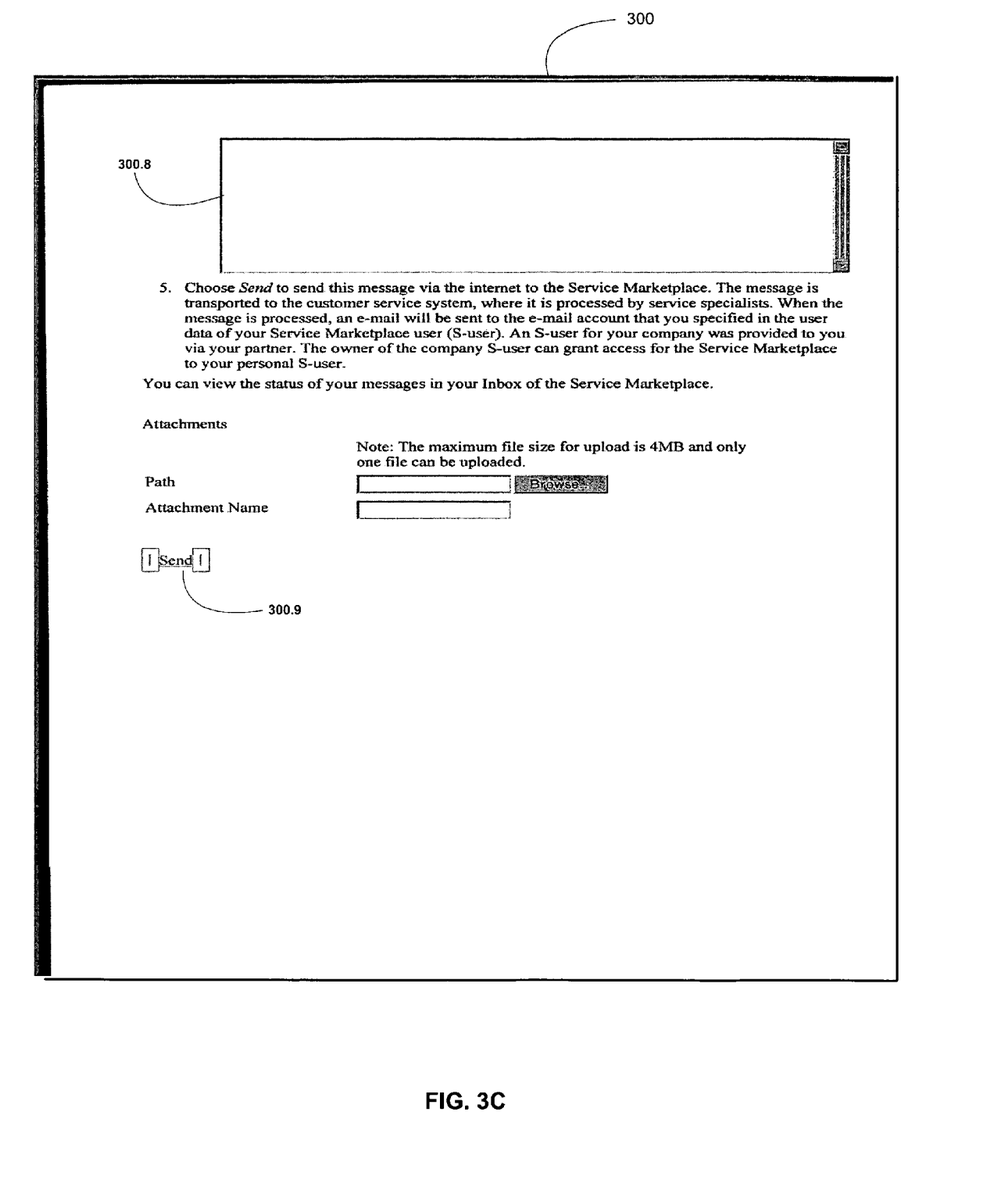

Referring to FIG. 3C, the screen display 300 may further include a field 300.8 for entering a detailed description of the problem, and a "Send" button 300.9. After the support seeker has entered information in the screen display 300, he may click on the "Send" button to send the information to the server 103. As described earlier, when the information arrives at the server 103, at least one of the system identifier and the installation identifier may be used to route the information to the appropriate inbox. The component information 300.4 (FIG. 3B) may further be used as a basis for routing the information to a particular inbox. The component information identifies a particular software component or application in which the problem is or is believed to be. The component information may have a hierarchical organization. For example, the component identifier SBO-SD-INV could stand for SAP Business One (SBO), Sales (SD), Invoice (INV). In the latter, SBO is a high-level identifier, SD is a mid-level identifier, and INV is a low-level identifier. This hierarchical organization may enable finer discrimination as to which inbox (and corresponding intermediate support provider) receives the support message.

In embodiments the support functionality may be included in a SAP Business One software package, and the local computer system 100 may include or be linked to an SAP Business One database. SAP Business One is a known business software package designed by SAP Aktiengesellschaft for small-to-midsize companies that provides such capabilities such as accounting, reporting, financial management, inventory management and logistics, and sales force automation.

The support functionality may be called or invoked from within, and/or by, the SAP Business One software.

The system and installation identifiers may be included in a license key provided by SAP to a Business One customer. The system identifier may uniquely identify a hardware platform that the Business One software is installed on, and the installation identifier may uniquely identify a version of an installed copy of Business One. For instance, a first version of Business One installed on a system might be the first "installation" of Business One on the system, while a subsequent upgraded version installed to replace the first version, or possibly an additional but different version from the first version installed on the system concurrently with the first version, might be the second "installation" of Business One on the system.

The two-tiered arrangement described above with reference to FIG. 2 reflects a business approach consistent with the effort to provide a low-cost support service for Business One. That is, an intermediate support provider may be a consulting services company that partners with SAP to be the point of actual contact with a customer. The partner's role may be to provide a certain range of support services to the Business One customer, but not all support services. Problems that the partner cannot resolve may be passed on to SAP. However, because typically the partner can resolve many problems, and at a lower cost than SAP itself since typically the partner already has knowledge of customer-specific details, costs are lowered for the Business One customer. Thus, the server 103 of FIG. 1 represents this low-cost customer-to-partner interface, in contrast to the comparatively expensive direct customer-to-SAP link of the prior art.

It is further noted that the first tier of the support service, meaning the customer-to-partner interface, may be fully integrated with pre-existing R/3® support systems. To this end, for example, the HTML document produced by the support functionality according to embodiments of the present invention may be formatted according to R/3® conventions, so that the transition to the second tier, where the support message is forwarded on to SAP if necessary, can take place smoothly.

SAP Business One may use a client/server processing model. Accordingly, components of the present invention could execute on one or more of a plurality of hardware platforms in a client-server environment. The environment may include client machines to handle front-end processing (e.g., user interfaces), application servers to process application logic, and database servers to handle database access.

Figure 4:
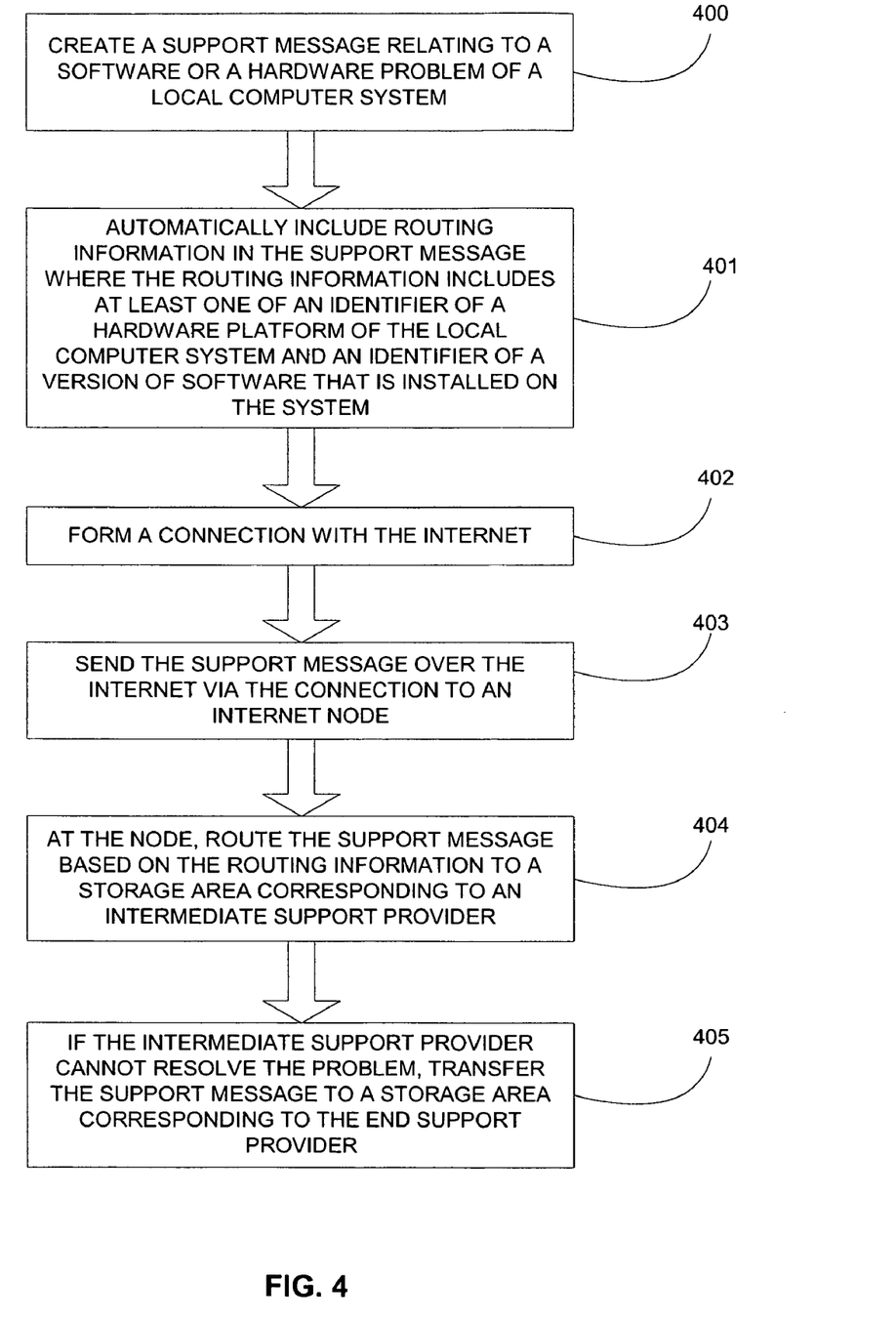
FIG. 4 shows another process flow according to embodiments of the present invention.

FIG. 4 shows a process flow according to embodiments of the present invention. As shown in block 400, software according to embodiments of the invention may execute to create a support message relating to a software or a hardware problem of a local computer system. As shown in block 401, the software may further automatically include routing information, where the routing information includes at least one of an identifier of a hardware platform of the local computer system, and an identifier of a version of software that is installed on the system. The component information as discussed earlier may also be used for routing.

A connection may be formed with the Internet, as shown in block 402. The support message may be sent over the Internet via the connection to a node of the Internet, as shown in block 403. At the node, the support message may be routed based on the routing information to a storage area corresponding to an intermediate support provider responsible for the support message, as shown in block 404. As shown in block 405, if the intermediate support provider cannot resolve the problem described in the support message, the support message may be transferred to storage area corresponding to the end support provider.

Figure 5:
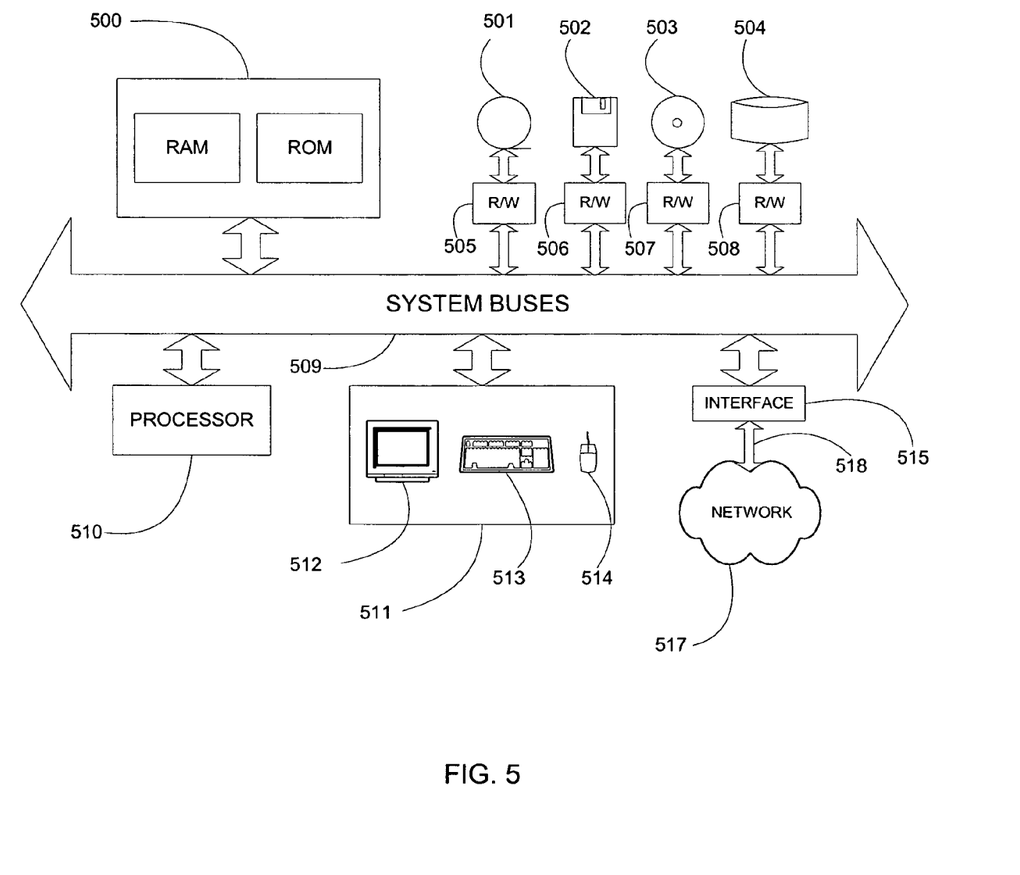
FIG. 5 shows a computer system for implementing embodiments of the present invention.

FIG. 5 shows a high-level representation of a computer system for implementing embodiments of the present invention, such as might be realized by a variety of known and commercially available hardware and software elements. The system may comprise a memory 500 including ROM and RAM, a processor 510 and a user interface 511 comprising a display device 512, a keyboard 513 and a mouse 514. Elements may communicate via system buses 509. The system may further comprise a network 517 connected by a network medium 518 and a network interface 515.

A computer program or collection of programs comprising computer-executable instructions according to embodiments of the present invention may be stored and transported on machine-readable media such as diskette 501, CD-ROM 502, magnetic tape 503 and fixed disk 504. The computer-executable instructions may be retrieved from the machine-readable media 501-504 using their respective reading devices 505-508 into memory 500, and executed by a processor 510. The computer-executable instructions may be distributed across a plurality of media, such as on physically separate storage devices respectively associated with physically separate computer systems that may communicate via a network. The functionality disclosed hereinabove may find specific implementations in a variety of forms, which are considered to be within the abilities of those of ordinary skill in the pertinent art after having reviewed the specification.

Several embodiments of the present invention are specifically illustrated and/or described herein. However, it will be appreciated that modifications and variations of the present invention are covered by the above teachings and within the purview of the appended claims without departing from the spirit and intended scope of the invention.

What is claimed is:

1. A method comprising, at a local computer system:
   when a fault of a software component is detected by a local computer system, creating a support message for transmission to an intermediate support system;
   automatically including routing information in the support message, wherein the routing information includes at least one of a system identifier identifying a hardware platform of the local computer system and an installation identifier identifying a version of software that is installed on the local computer system, the system identifier and the installation identifier taken from a license key associated with the software component;
   sending the support message to the intermediate support system via the Internet;
   responsive to a reply message received from the intermediate support system, collecting additional information relating to the fault and transmitting an answer message to the intermediate support system responsive thereto;
   if the intermediate support system can identify a solution to the fault, receiving a solution message from the intermediate support system and installing a patch provided therein; and
   if the intermediate support system cannot identify a solution to the fault, receiving a solution message from an end support system to which the support message is escalated from the intermediate support system and installing a patch provided therein.

2. The method of claim 1, further comprising: at the intermediate support system, routing the support message based on the routing information to a storage area corresponding to an intermediate support provider, wherein the intermediate support provider is intermediate between a support seeker sending the support message and an end support provider associated with the end support system.

3. The method of claim 2, wherein the storage area includes an e-mail inbox.

4. The method of claim 1, wherein at least a portion of the support message includes HTML formatting.

5. The method of claim 1, wherein creating the support message invokes an Internet browser.

6. The method of claim 1, wherein the software that is installed is SAP Business One.

7. The method of claim 1, wherein the support message is compatible with SAP R/3.

8. The method of claim 1, wherein the intermediate support system includes e-mail functionality.

9. A method comprising:
presenting a display for creating a support message, the display including an input field for a description of a fault of a software component detected by a local computer system;
creating, as at least a portion of the support message, an HTML-formatted record including the description; and
automatically including in the support message at least one of an identifier of a hardware platform of the local computer system and an identifier of a version of software that is installed on the local computer system, the identifier of the hardware platform and the identifier of the version of software taken from a license key associated with the software component.

10. The method of claim 9, further comprising:
sending the support message over the Internet to a server, wherein at the server the support message is routed to a support provider based on at least one of the identifier of the hardware platform and the identifier of the software version.

11. The method of claim 10, further comprising:
responsive to a reply message received from the support provider, collecting additional information relating to the fault and transmitting an answer message to the support provider responsive thereto, wherein the support provider is intermediate between a support seeker sending the support message and an end support provider,
if the support provider can identify a solution to the fault, receiving a solution message from the support provider and installing a patch provided therein,
if the support provider cannot identify a solution to the fault, receiving a solution message from the end support provider to which the support message is escalated from the support provider and installing a patch provided therein.

12. The method of claim 9, wherein presenting the display for creating the support message invokes an Internet browser.

13. The method of claim 9, wherein the display further includes an input field for a priority of the problem.

14. The method of claim 9, wherein the software that is installed is SAP Business One.

15. The method of claim 9, wherein the support message is compatible with SAP R/3.

16. The method of claim 9, wherein the display further includes an input field for component information identifying the software component having the fault.

17. The method of claim 16, wherein the component information is further used to route the support message to the support provider.

18. A machine-readable medium comprising computer-executable instructions to:

when a fault of a software component is detected by a local computer system, create a support message for transmission to an intermediate support system;
automatically include routing information in the support message, wherein the routing information includes at least one of a system identifier of a hardware platform of the local computer system and an installation identifier identifying a version of software that is installed on the local computer system, the system identifier and the installation identifier taken from a license key associated with the software component;
send the support message to the intermediate support system via the Internet;
responsive to a reply message received from the intermediate support system, collect additional information relating to the fault and transmit an answer message to the intermediate support system responsive thereto,
if the intermediate support system can identify a solution to the fault, receive a solution message from the intermediate support system and install a patch provided therein,
if the intermediate support system cannot identify a solution to the fault, receive a solution message from an end support system to which the support message is escalated from the intermediate support system and install a patch provided therein.

19. The machine-readable medium of claim 18, wherein the instructions further: at the intermediate support system, route the support message based on the routing information to a storage area corresponding to an intermediate support provider, wherein the intermediate support provider is intermediate between a support seeker sending the support message and an end support provider associated with the end support system.

20. The machine-readable medium of claim 18, wherein at least a portion of the support message includes HTML formatting.

21. A method comprising, at a first support system intermediate between a local computer system and an end support system:
associating a status to a support message received from the local computer system, the support message relating to a fault of a software component at the local computer system and including a system identifier identifying a hardware platform of the local computer system and an installation identifier identifying a version of software installed on the local computer system, the system identifier and the installation identifier taken from a license key associated with the software component;
processing the support message;
when further information regarding the fault is required to diagnose the fault:
transmitting a reply message to the local computer system that solicits additional information relating to the fault, and
integrating data from an answer message received from the local computer system in response thereto;
if the intermediate support system can identify a solution to the fault, transmitting a solution message to the local computer system that includes a patch related to the solution; and
if the intermediate support system cannot identify a solution to the fault, escalating the support message to the end support system.

* * * * *